United States Patent
McCardle (10) Patent No.: US 6,392,186 B1
(45) Date of Patent: May 21, 2002

(54) DISPOSABLE COLLET ADAPTER

(75) Inventor: Thomas A. McCardle, Cincinnati, OH (US)

(73) Assignee: Senco Products, Inc., Cincinnati, OH (US)

( * ) Notice: Subject to any disclaimer, the term of this patent is extended or adjusted under 35 U.S.C. 154(b) by 0 days.

(21) Appl. No.: 09/556,347

(22) Filed: Apr. 24, 2000

(51) Int. Cl.⁷ .............................. B23K 9/00; B23K 11/04
(52) U.S. Cl. ........................................ 219/98; 219/99
(58) Field of Search ..................... 219/98, 99

(56) References Cited

U.S. PATENT DOCUMENTS

| | | | |
|---|---|---|---|
| 3,312,810 A | 4/1967 | Neumeier | 219/98 |
| 3,371,184 A | 2/1968 | Napoli | 219/98 |
| 3,706,870 A | 12/1972 | Sauder et al. | 219/98 |
| 3,854,027 A * | 12/1974 | Ettinger et al. | 219/98 |
| 3,910,324 A | 10/1975 | Nasiatka | 144/32 |
| 4,027,136 A | 5/1977 | Taylor | 219/98 |
| 4,092,514 A * | 5/1978 | Burton | 219/99 |
| 4,137,445 A * | 1/1979 | Ettinger | 219/98 |
| 4,163,888 A | 8/1979 | Ettinger | 219/98 |
| 4,267,425 A * | 5/1981 | Kondo | 219/98 |
| 4,267,426 A * | 5/1981 | Mallett | 219/98 |
| 4,420,674 A | 12/1983 | Jordan | 219/98 |
| 4,562,329 A | 12/1985 | Minton | 219/99 |
| 4,620,079 A | 10/1986 | Allmann et al. | 219/98 |
| 4,669,742 A * | 6/1987 | Broszukat | 279/41 A |
| 4,792,655 A * | 12/1988 | Ettinger | 219/98 |
| 4,821,401 A | 4/1989 | Williams | 29/368 |
| 4,863,089 A * | 9/1989 | McCardle et al. | 227/116 |
| 5,130,510 A | 7/1992 | Zeigler et al. | 219/99 |
| 5,146,675 A * | 9/1992 | Ford et al. | 29/123 |
| 5,233,151 A * | 8/1993 | Aoyama | 219/98 |
| 5,384,445 A | 1/1995 | Nakagami | 219/98 |
| 5,389,762 A | 2/1995 | Schneegans | 219/98 |
| 5,560,118 A * | 10/1996 | Plummer | 33/709 |
| 5,565,116 A * | 10/1996 | Barton et al. | 219/98 |
| 5,681,061 A | 10/1997 | Olson | 285/322 |
| 5,688,414 A | 11/1997 | Kondo | 219/98 |
| 5,753,883 A | 5/1998 | Remerowski | 219/98 |
| 5,824,987 A | 10/1998 | Volk | 219/98 |
| 5,921,561 A | 7/1999 | Cedarberg, III | 279/50 |

FOREIGN PATENT DOCUMENTS

| | | | |
|---|---|---|---|
| DE | 1 022 334 | 9/1956 | |
| DE | 1112221 | 8/1961 | 219/98 |
| DE | 295 18 041 | 5/1996 | |
| FR | 1259217 | 3/1961 | |
| GB | 668402 | 3/1952 | 219/98 |
| JP | 57-17389 | 1/1982 | 219/98 |
| JP | 61095782 | 5/1986 | |
| SU | 733908 | 5/1980 | 219/98 |
| WO | WO 92/06814 | 4/1992 | |

* cited by examiner

*Primary Examiner*—Tom Dunn
*Assistant Examiner*—Zidia Pittman
(74) *Attorney, Agent, or Firm*—Wood, Herron & Evans, L.L.P.

(57) ABSTRACT

A disposable collet adapter for attaching a workpiece to a stud welding tool. One end of the resilient collet adapter slideably mounts to one end of a workpiece and the opposed end slideably attaches to the electrode of the stud welding tool. The opposed ends of the collet adapter are individually tailored so that of the workpiece and the electrode may have distinct cross-sectional profiles. After a welding operation, the collet adapter can be discarded or reused.

27 Claims, 8 Drawing Sheets

DISPOSABLE COLLET ADAPTER

FIELD OF THE INVENTION

The present invention relates to stud welding.

BACKGROUND OF THE INVENTION

The art of stud welding is well known. The present invention is directed to that segment of the stud welding art employing a manual stud welding tool.

Prior art workers have devised a number of different types of stud welding tools, all of which operate in substantially the same manner. The tool operator manually mounts an individual workpiece on the electrode of the tool, which is typically in the form of a conical collet adapted to hold a workpiece. The operator then causes the tool to press the free end of the workpiece against a metallic surface at the position where the workpiece is to be mounted. Electrical current is applied to the workpiece, which is then slightly raised from the metallic surface to initiate an arc. The free end surface of the workpiece and the adjacent area of the metallic surface are rendered molten by the arc. The molten end of the workpiece is then again pressed against the molten surface, and then the electrical current is switched off. When the melt zone cools, the workpiece is welded to the metallic surface. The tool is then pulled from the workpiece and is ready to receive another workpiece.

Stud welding tools in the prior art are characterized by the fact that a given tool may be used with multiple sizes of workpieces. However, in a typical tool, to use a different size of workpiece, the electrode must be removed and replaced with an appropriately sized electrode to accommodate the new workpiece size. Furthermore, sliding friction from the cumulative effect of attaching multiple workpieces to the electrode wears the electrode mount. Eventually, the erosion necessitates replacement of the worn electrode. In addition, a conventional electrode can only accept workpieces having a simple geometry, such as a cylindrical threaded stud. Workpieces having flanges on the portion to be mounted to the electrode cannot be accepted without a special purpose electrode.

Thus, what is ideally desired is a device that can couple a workpiece having an arbitrary size or geometry and an electrode of a stud welding tool of a differing size or geometry for a welding operation while simultaneously reducing erosion of the tool due to sliding friction.

SUMMARY OF THE INVENTION

The present invention addresses these and other problems associated with the prior art by providing a disposable collet adapter for use with a manual stud welding tool so that workpieces of various sizes and geometries may be grasped for a subsequent welding operation.

A disposable collet adapter having features of the present invention comprises a hollow, elongate sleeve having a proximal open end and a distal open end. The collet adapter is adapted to couple a workpiece to an electrode of a stud welding tool. The proximal open end of the collet adapter is attachable in a readily releaseable fashion to an electrode of a stud welding tool. The distal open end of the collet adapter is releasably mounted to one end of the workpiece.

The cross-sectional profiles of the distal and proximal open ends of the disposable collet adapter are individually tailored to accommodate the corresponding cross-sectional profiles of the workpiece and electrode, respectively. As a result, the opposed open ends of the collet adapter can have divergent cross-sectional profiles. In addition, to facilitate use, either end of the collet adapter may include a flange.

The free end of the workpiece is fused to a metallic substrate in a welding operation as previously described. At one or both opposed ends, the workpiece will typically incorporate a fastening structure such as a shaped flange or a threaded surface.

If desired, a portion of the threaded end of the workpiece can be coated with a threadlocking chemical before or after a welding operation.

In a first mode of assembly, a single disposable collet adapter can be attached to the electrode and remain attached to mount a succession of workpieces having identical or similar ends. Alternatively, each workpiece can have its own collet adapter that remains attached to the workpiece following a welding operation.

The disposable collet adapter can be employed to couple the workpiece to the electrode of a stud welding tool having an automatic-feed mechanism. An automatic-feed stud welding tool can transport a succession of workpieces in a collating strip assembly into a position for a welding operation without individualized manual placement.

In a disclosed additional aspect, the invention provides an adapter for an automatic feed mechanism used in a stud welding tool. This adapter comprises an elongated insert sized for insertion into the feed mechanism to adapt the feed mechanism to fit a particular collating strip assembly.

An advantage of the disposable collet adapter is that a series of workpieces, each having a unique cross-sectional profile, can be welded without altering the electrode of the stud welding tool. The process of replacing the electrode of a stud welding tool is time-consuming and inconvenient. Another advantage is that the disposable collet adapter is an inexpensive construct that can be discarded after use. Yet another advantage is that the disposable collet adapter can intervene to prevent wear of the contacting surface of the electrode. When the electrode is prophylactically shielded by a disposable collet adapter, the frictional contact will occur between the contacting surfaces of the workpiece and collet adapter, not between the contacting surfaces of the workpiece and electrode.

These and other objects, advantages, features, and embodiments will be apparent with reference to the following drawings and detailed written description.

BRIEF DESCRIPTION OF THE DRAWINGS

The accompanying drawings, which are incorporated in and constitute a part of the specification, illustrate embodiments of the invention and, together with a general description of the invention given above and the detailed description of the embodiments given below, serve to explain the principles of the invention.

DESCRIPTION

Figure 1A:
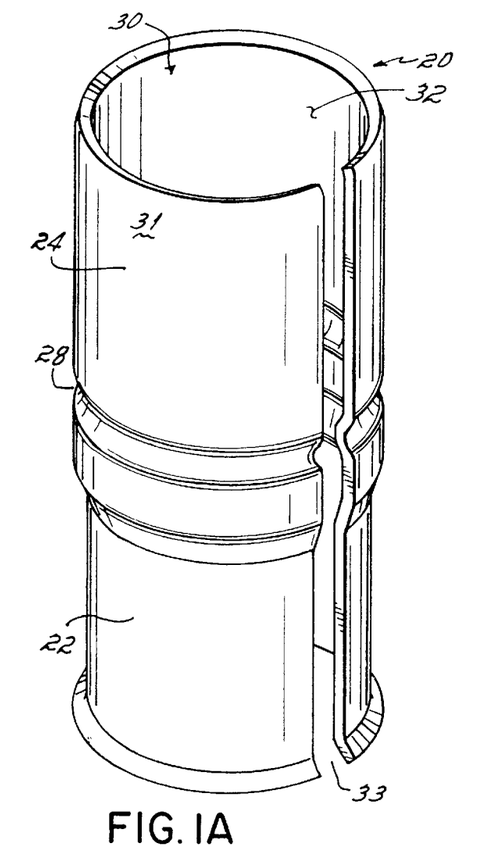
FIG. 1A is a perspective view of a cylindrical disposable collet adapter having ends of equal average cross-sectional area.
Figure 1B:
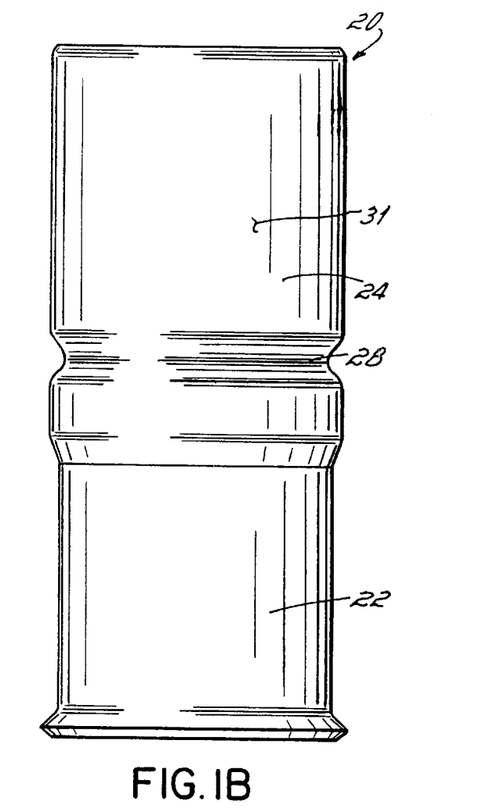
FIG. 1B is a side elevational view of the disposable collet adapter as shown in FIG. 1A.

Referring to FIGS. 1A and 1B, a disposable collet adapter is shown in a perspective view and a plan view, respectively. The collet adapter, indicated generally at 20, comprises a hollow, elongate sleeve. The collet adapter 20 includes a proximal open end 24, a distal open end 22, a longitudinal slit 33, an outer surface 31, and an inner surface 32, and defines a cavity 30 therein.

The proximal open end 24 and distal open end 22 of the disposable collet adapter 20 have distinct cross-sectional profiles, referenced with respect to the longitudinal axis of the collet adapter 20. Hereinafter, all cross-sectional profiles are referenced with respect to the longitudinal axis of the referenced object. In the embodiment illustrated in FIGS. 1A and 1B, the cross-sectional profiles of the distal open end 22 and the proximal open end 24 are nominally equal and circular, and the average cross-sectional area of the two open ends 22, 24 is approximately equivalent. However, as will be discussed below, the two ends 22. 24 of the collet adapter 20 can have dissimilarly-shaped cross-sectional profiles of similar sizes, similarly-shaped cross-sectional profiles of dissimilar sizes, or dissimilarly-shaped cross-sectional profile of dissimilar sizes. Possible alternative shapes include, but are not limited to, oval or rectangular.

The longitudinal slit 33 extends along a portion of the length of the disposable collet adapter 20. In the embodiment shown in FIG. 1A, the slit 33 extends the entire length of the collet adapter 20. The slit 33 imparts elastic resiliency so that the collet adapter 20 can be compressed to elastically reduce its diameter or expanded to elastically increase its diameter. When the expansive or compressive force is removed, the collet adapter 20 returns to its unstressed diameter. It follows that one or both ends of the collet adapter 20 can either compress to fit within an aperture or expand to receive an object within the cavity 30. In the embodiment shown, the cavity 30 further includes an annular shoulder 28. The annular shoulder 28 functions as a stop to limit the slideable motion of an object received within the cavity 30.

Preferably, the disposable collet adapter 20 is composed of a metal, such as aluminum, or other conductive material. Good electrical contact and continuity between the collet adapter, workpiece and electrode are essential to a successful welding operation. The collet adapter 20 may be formed from a thin metal sheet by rolling, stamping or another known metalworking technique.

FIGS. 2A–D show various configurations of a disposable collet adapter, a workpiece and an electrode collet. The proximal open end 24 of the collet adapter 20 is slideably attachable to an electrode 27 of a stud welding tool (not shown). The cross-sectional profile of the proximal open end 24 is tailored to mate with the cross-sectional profile of the recess 25 formed in the electrode 27. The interior of the recess 25 is designed to apply an annular compressive force to the contacted outer surface of the proximal open end 24 of the collet adapter 20. For example, the recess may be a collet, a chuck, or some structure with a similar function. The annular compressive force establishes good mechanical and electrical contact between the collet adapter 20 and the electrode 27. The annular compressive force is transmitted to the distal open end 24 of the collet adapter 20.

The distal open end 24 of the disposable collet adapter 20 is slideably mountable to an opposed end of a workpiece 26. The cross-sectional profile of the proximal open end 24 is tailored to mate with the cross-sectional profile of the opposed end of the workpiece 26. In the particular embodiment shown, the workpiece 26 is a cylindrical, threaded stud and the cross-sectional profile of the distal open end 24 is round. Alternatively, the workpiece could have a different cross-sectional profile or lack threads. The annular compressive force, discussed above, acts to clamp one opposed end of the workpiece 26 in the interior of the distal open end 24 and aids static friction to establish good mechanical contact and concomitant electrical contact.

Figure 2A:
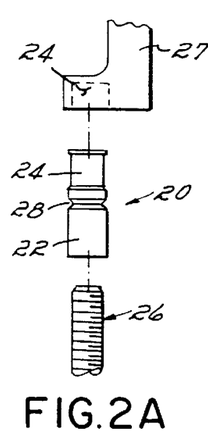
FIGS. 2A–D are side elevational views that illustrate possible configurations of the combination of an electrode, a disposable collet adapter, and a workpiece.
Figure 2B:
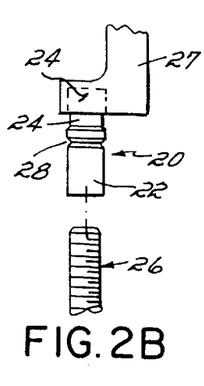

As shown in FIG. 2A, a workpiece 26, a disposable collet adapter 20 and an electrode 27 associated with a stud welding tool (not shown) comprise the trio of components that are combined to create an assembly for a subsequent welding operation. In a first method of assembly, the proximal open end 24 of the collet adapter 20 is attached to the electrode 27 to form the partially-assembled structure shown in FIG. 2B. Then, the distal open end 22 of the collet adapter 20 is mounted to one opposed end of the workpiece 26 to create the fully-assembled construct shown in FIG. 2D. Annular shoulder 28 acts as a stop so that one opposing end of the workpiece 26 and the interior of the distal open end 22 of the collet adapter 20 are coextensive.

Figure 2C:
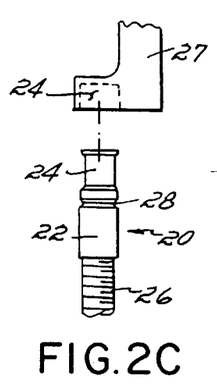

In an alternative method of assembly, the disposable collet adapter 20 is first mounted to one end of the workpiece to form the partially-assembled construct shown in FIG. 2C. Then, the combination of the workpiece and the collet adapter is attached to the electrode to form the fully-assembled construct shown in FIG. 2D. After a welding operation, the collet adapter may be disposed of.

Figure 2D:
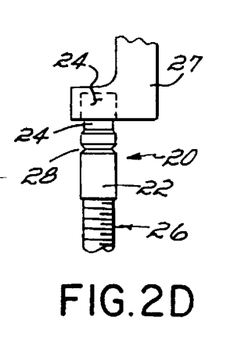

Disposal of the disposable collet adapter 20 follows disassembly of the fully-assembled construct shown in FIG. 2D. In a first method of disassembly, after the workpiece 26 has been welded to a surface, the combination of the collet adapter 20 and electrode 27 are removed from workpiece 26 as shown in FIG. 2C. The collet adapter 20 remains attached to the electrode 27 so that an opposing end of another workpiece 26' (not shown but having a cross-sectional profile similar to workpiece 26) can be mounted thereto in a readily releasable fashion.

Rather than receiving a second workpiece, the disposable collet adapter 20 can be removed from the recess 25 in the electrode 27. Subsequently, the collet adapter 20 can be either discarded or attached to another workpiece 26' (not shown).

In an alternative method of disassembly, after the workpiece 26 has been welded to a surface, the electrode 27 is lifted from combination of the disposable collet adapter 20 and workpiece 26. The collet adapter 20 can then either be removed from the workpiece 26 and attached to a second workpiece 26' (not shown), be removed and discarded, or remain permanently affixed to the first workpiece 26.

Many alternative embodiments of the disposable collet adapter 20 are possible. Either or both open ends 22, 24 of the collet adapter 20 can be altered to accommodate an electrode 27 and/or a workpiece 26 having a non-circular cross-sectional profile or an electrode 27 and a workpiece 26 having similar-shaped cross-sectional profiles of differing areas. As a result, workpieces 26 having a wide variety of shapes and/or flanges can be mounted to the electrode 27.

Figure 3A:
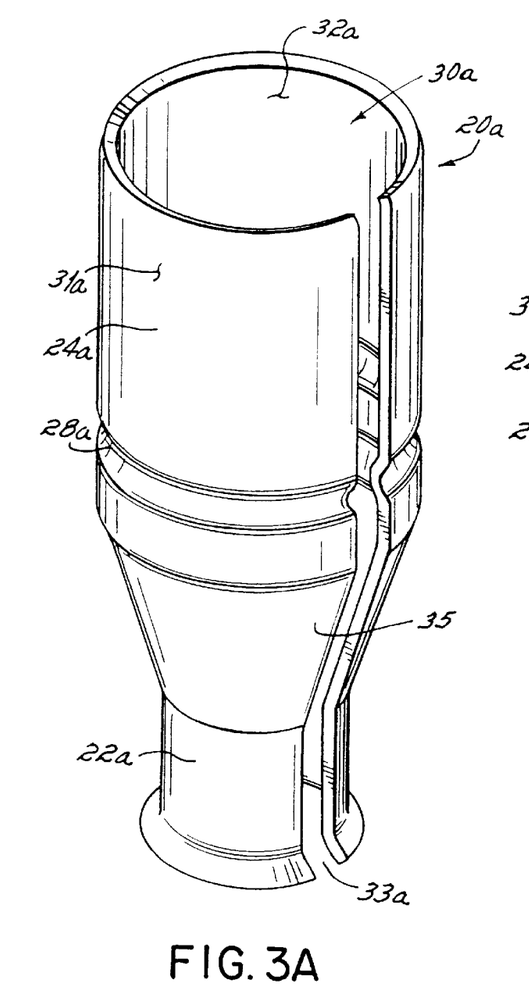
FIG. 3A is a perspective view of a cylindrical disposable collet adapter wherein the end that attaches to the electrode has the larger cross-sectional area.
Figure 3B:
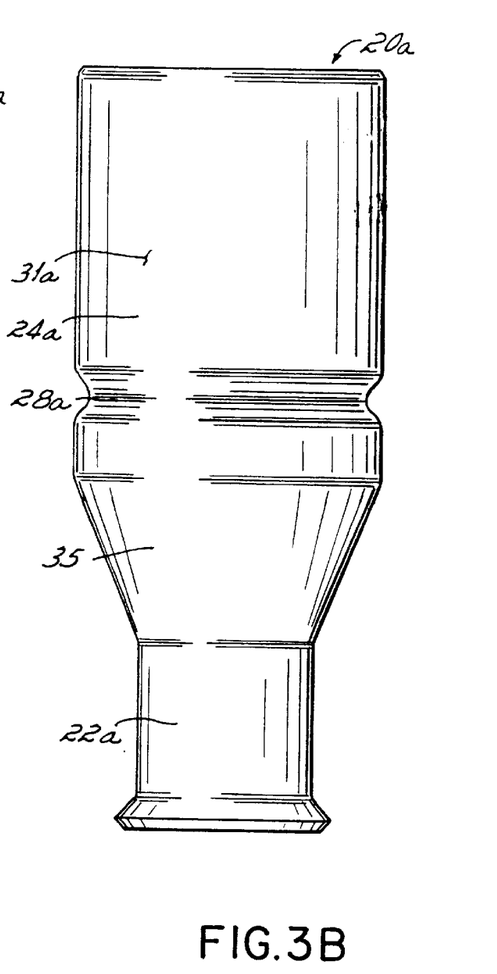
FIG. 3B is a side elevational view of the disposable collet adapter shown in FIG. 3A.

FIGS. 3A and 3B show one alternative embodiment of the disposable collet adapter shown generally at 20a. The area of the cross-sectional profile of the proximal open end 24a of collet adapter 20a is larger than the area of the cross-sectional profile of the distal open end 22a. To accommodate the disparate cross-sections, a tapered segment 35 joins the two open ends 22a, 24a. Similar to the collet adapter 20 of FIG. 1, the collet adapter 20a has a nominally round cross-sectional profile, longitudinal slit 33a, an annular shoulder 28a, and inner and surfaces 31a, 32a. Also, similar to collet adapter 20, the proximal open end 24a of the collet adapter 20a is designed to receive a compressive force from the electrode of a stud welding tool and transmit that force to the distal open end 22a so that a workpiece 26 is clamped for a welding operation.

Figure 4A:
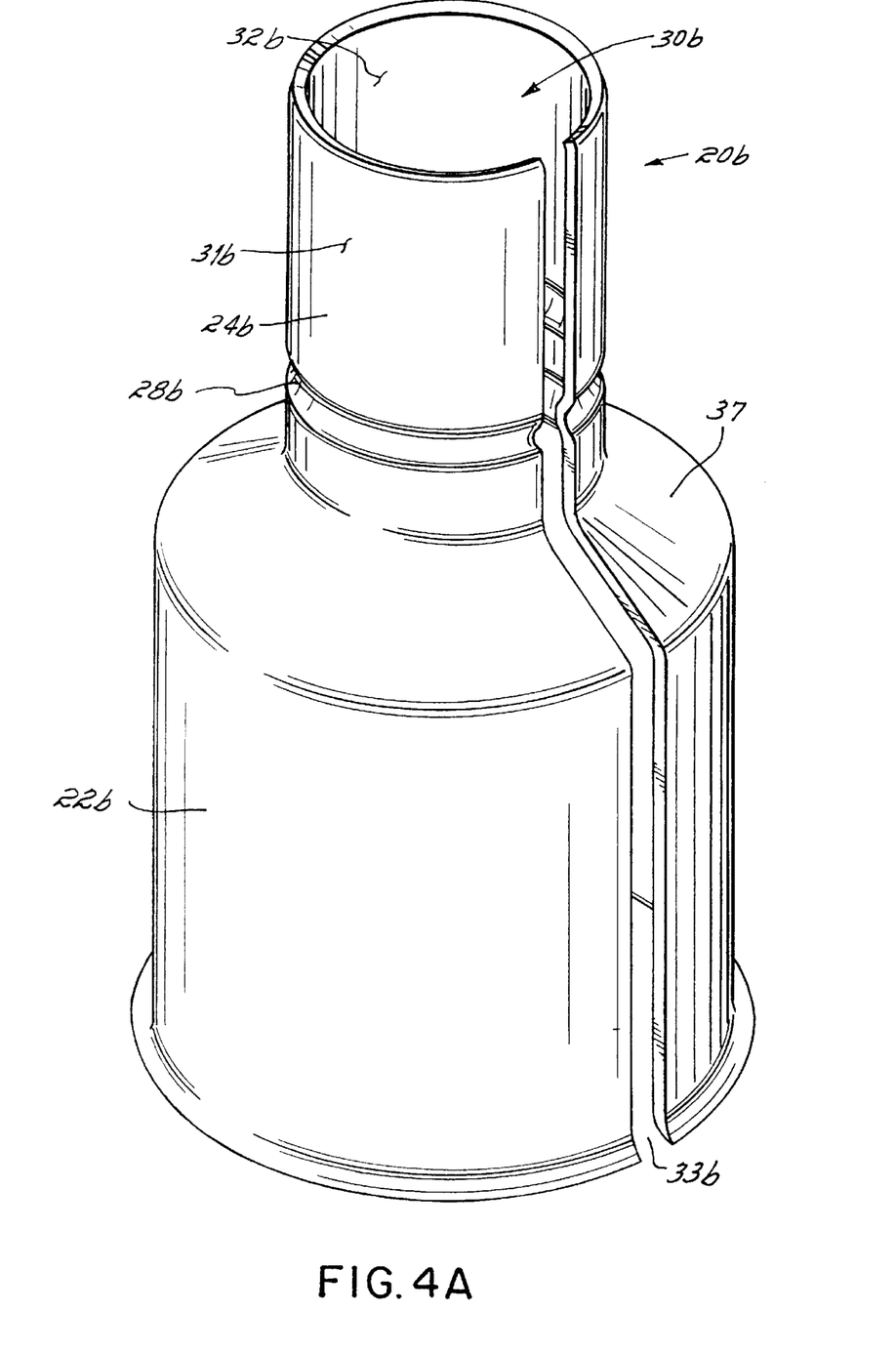
FIG. 4A is a perspective view of a disposable collet adapter wherein the end that attaches to the workpiece has the larger average cross-sectional area.
Figure 4B:
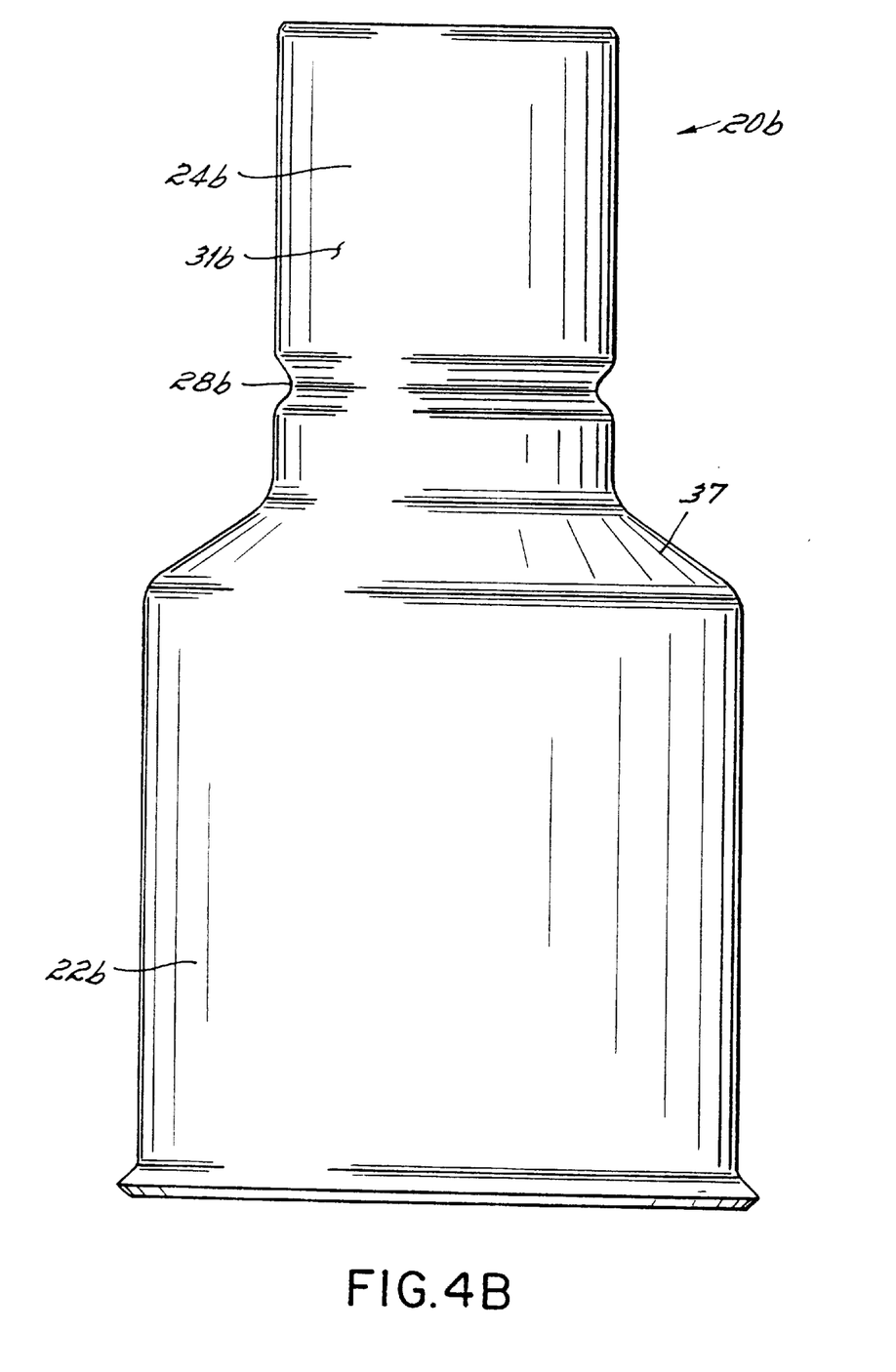
FIG. 4B is a side elevational view of the disposable collet adapter shown in FIG. 4A.

FIGS. 4A and 4B show another alternative embodiment of the disposable collet adapter shown generally at 20b. The area of the cross-sectional profile of the proximal open end 24b of collet adapter 20b is smaller than the area of the cross-sectional profile of the distal open end 22b. To accommodate the disparate cross-sections, a flared segment 37 joins the two open ends 22b, 24b. Similar to the collet adapter 20 of FIG. 1 and the disposable collet adapter of FIG. 3, the collet adapter 20b has a longitudinal slit 33b, an annular shoulder 28b and inner and outer surfaces 31b, 32b. Also similar to collet adapter 20, the proximal open end 24b of the collet adapter 20b is designed to receive a compressive force from the electrode of a stud welding tool and transmit that force to the distal open end 22b so that a workpiece 26 is clamped for a welding operation.

Figure 5A:
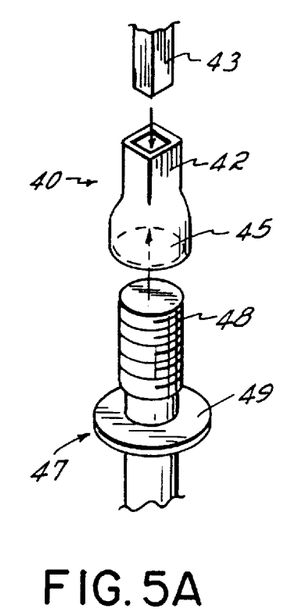
FIG. 5A is a perspective view of a disposable collet adapter designed to couple a rectangular electrode and a cylindrical threaded workpiece having a central flange.
Figure 5B:
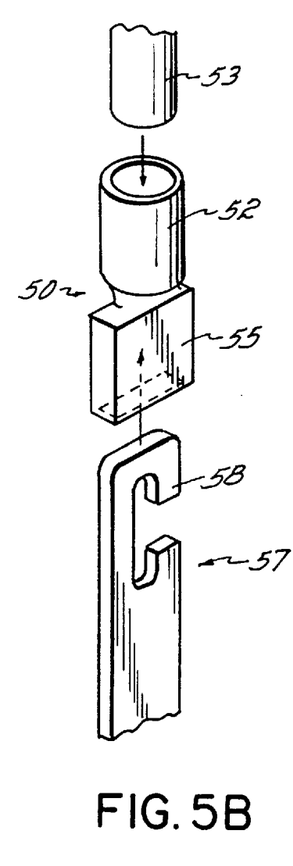
FIG. 5B is a perspective view of a disposable collet adapter designed to couple a cylindrical electrode and a flat rectangular workpiece having a flange on the end of engagement.

FIGS. 5A and 5B illustrate additional alternative embodiments of the disposable collet adapter and workpiece combination in which the collet adapter has opposed open ends with cross-sectional profiles of diverse shape. In FIG. 5A, the proximal open end 42 of the collet adapter 40 has a rectangular cross-sectional profile for mating with an elongate rectangular electrode 43 also having a rectangular profile of similar cross-sectional dimensions. The distal open end 45 of the collet adapter 40 has a round cross-sectional profile for mounting to a end of a cylindrical workpiece 47 that likewise presents a circular cross-sectional profile. As a result, the collet adapter 40 can wed a cylindrical workpiece 47 with an electrode 43 having a rectangular profile for a subsequent welding operation.

The workpiece 47 may include a flange 48 disposed adjacent to either opposed end. It may be understood that the flange 48 can have a configuration other than a flat annular disk. The workpiece 47 may also include a portion 49 having threads circumferentially disposed about the exterior surface or may be an elongate flat member.

In FIG. 5B, the proximal open end 52 of the disposable collet adapter 50 has a circular cross-sectional profile for mating with an elongate cylindrical electrode 53 also having a circular cross sectional profile of similar diameter. The distal open end 55 of the collet adapter 50 has a rectangular cross-sectional profile for mounting to a rectangular end of a workpiece 57 that likewise presents a rectangular cross-sectional profile. As shown, one opposed end of the workpiece 57 may include a flange 58. It may be understood that the flange 58 can have a configuration other than the C-hook shown. Flanges, such as flange 58, facilitate attachment of additional structures to the welded workpiece.

Figure 6:
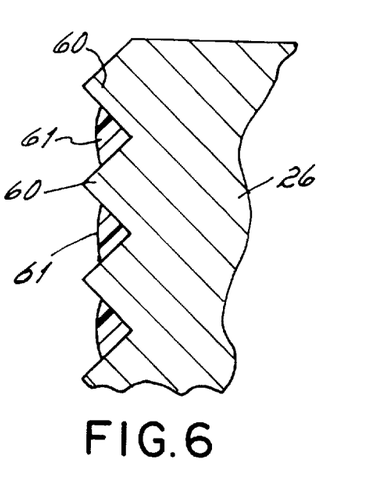
FIG. 6 is an enlarged illustration of a threaded workpiece of with a chemical threadlocker applied.

Referring to FIG. 6, an enlarged section of a workpiece 26 having threads 60 disposed about a portion of its peripheral surface is shown. In the valleys between adjacent threads 60, a threadlocking chemical 59 has been applied. Threadlocking chemicals include, for example, the family of pre-applied threadlockers manufactured by Loctite Corporation of Hartford, Conn. and exemplified by U.S. Pat. Nos. 5,853,520, 5,635,546 and 4,417,028. The threadlocking chemical 59 can be applied to the threads 60 either before or after the threaded workpiece 26 has been welded to a metal substrate. However, if applied to the portion of the workpiece 26 received within the electrode of the stud welding tool, the threadlocking chemical 59 cannot completely encase the threads 60 since the workpiece 26 would then be electrically insulated from the electrode. If desired, the workpiece 26 carrying the threadlocker chemical 59 may be attached to the electrode via a disposable collet adapter.

A kit may be prepared which comprises a plurality of workpieces and a plurality of disposable collet adapters. Optionally, the kit may comprise a greater number of workpieces than collet adapters. It may be understood that the plurality of collet adapters may include any of the various embodiments discussed above, so that a wide assortment of workpieces having differing configurations may be included in the kit.

Figure 7:
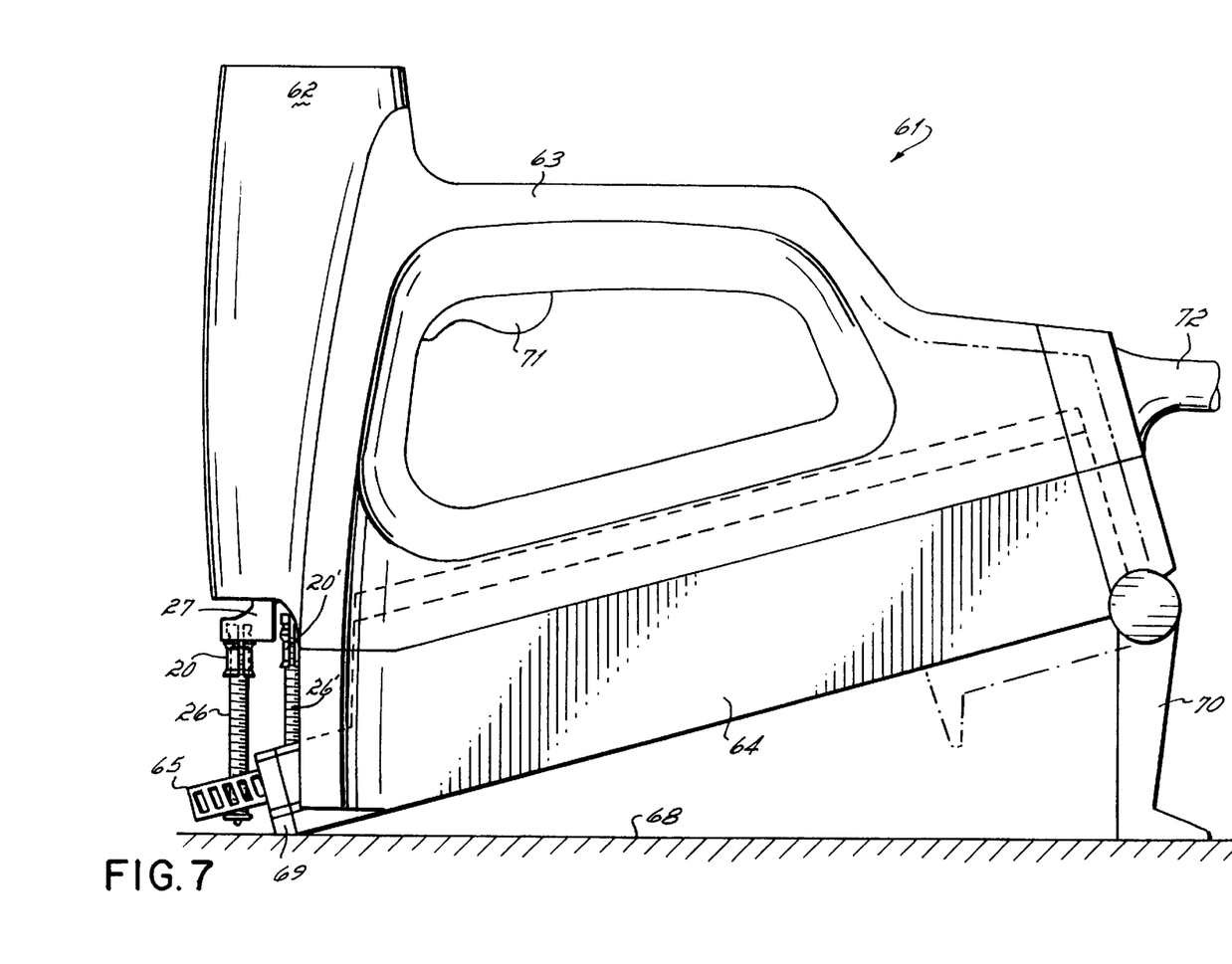
FIG. 7 is a side elevational view of a stud welding tool having a disposable collet adapter and a workpiece mounted to its electrode.

FIG. 7 shows a stud welding tool featuring automatic feed of a series of workpieces for successive welding operations. The tool is indicated generally at 61 and has a forward main body portion 62, and a handle portion 63. The specific stud welding tool depicted includes a magazine 64 that is slideably mounted within the main body portion of the tool 61. A collating strip assembly 65 is received in the interior of the magazine 64. The collating strip assembly 65 moves longitudinally within the interior of the magazine 64 to transport a succession of collated workpieces 26 for attachment to an electrode 27. The collating strip assembly 65 is positioned so that one end of the first workpiece 26 is proximate to the electrode 27. Disposable collet adapters 20 may be attached to the ends of the workpieces 26.

The magazine 64 is provided with a forward surface 69 which may be caused to engage the metallic substrate 68 to stabilize the tool. A flip down stabilizer 70 is pivotally attached to the rear end of the tool and is shiftable between a retracted position (not shown) and extended position (shown). The tool also includes an actuating trigger 71 and is completed by an appropriate cable connection 72 (fragmentarily shown in FIG. 7) to a power source. When the trigger 71 is depressed, circuitry is energized to supply power to the electrode 27 and a welding operation is performed.

Figures 8, 9:
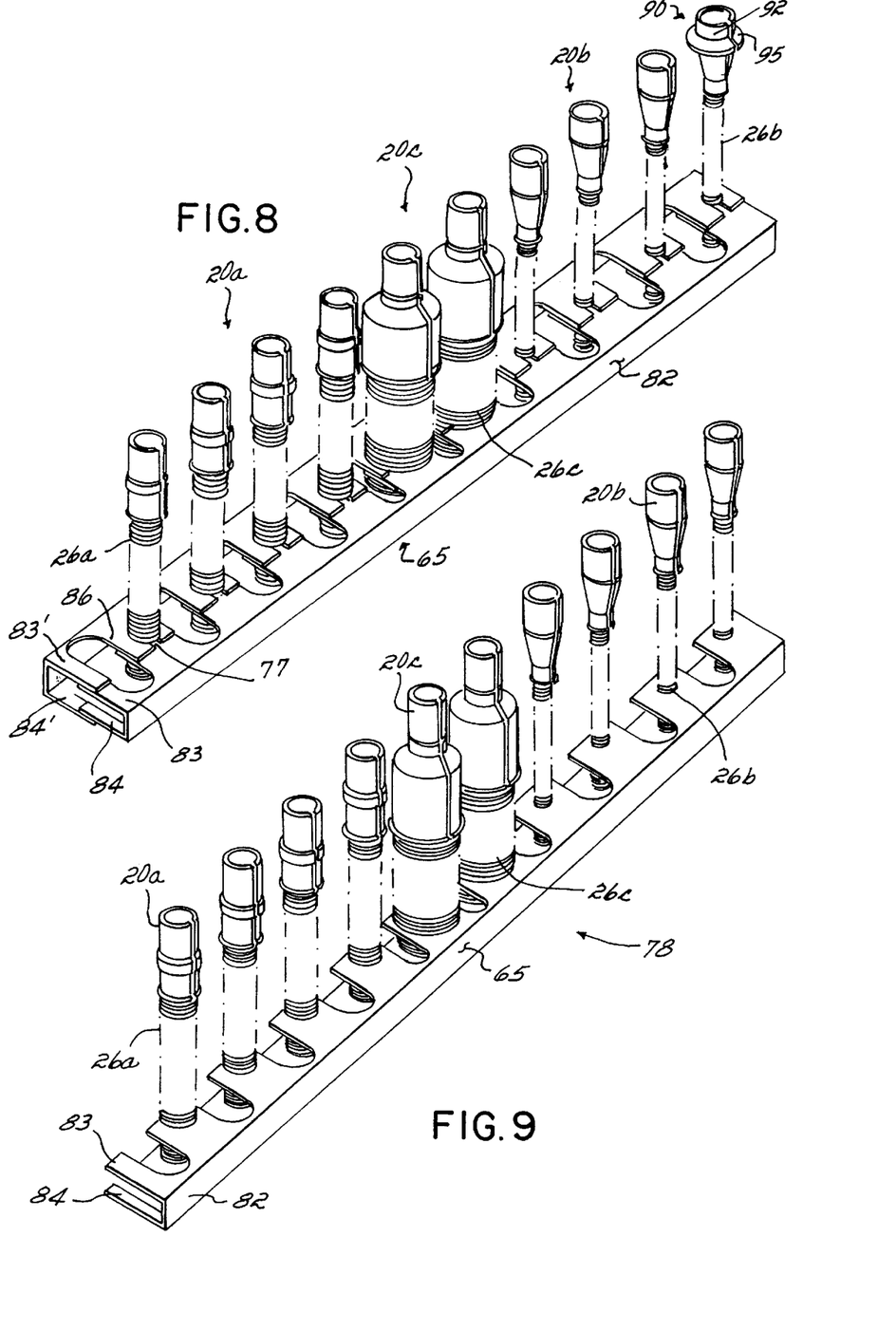
FIG. 8 is a perspective view of a collating strip assembly holding multiple workpieces and attached disposable collet adapters that is for use in an automatic feeding stud welding tool.
FIG. 9 is a perspective view showing an alternative embodiment of the collating strip assembly.

FIG. 8 shows a collating strip assembly and an aggregation of workpieces carrying disposable collet adapters. The collating strip assembly, shown generally at 65, is an elongate, rectangular member that includes a plurality of cells 77. The collating strip assembly 65 is formed from two collating strip subassemblies 78, 79 that are substantially similar. Each collating strip subassembly 78, 79 is an elongate member having a C-shaped cross-section. Each collating strip subassembly 78, 79 has an end wall 82 and two parallel sidewalls 83, 84. Each sidewall 83, 84 includes a plurality of tabs 86. Each tab 86 includes a cell 77 that is designed to receive and reasonably retain the shank of one workpiece 26a, 26b, 26c. The width of each cell 77 is tailored to receive the diameter of the shank of one workpiece 26a, 26b, 26c. The end wall 82 of the collating strip subassembly 78 has a smaller latitudinal dimension that the end wall 82' of the other collating strip subassembly 79. To join the two subassemblies 78, 79 to form the assembly 65, the subassemblies 78, 79 slideably interconnect. The shanks of workpieces 26a, 26b, 26c are being releasably grasped with four points of attachment by adjacent pairs of cells 77, 77' in the overlapping upper sidewalls 83, 83' and overlapping lower sidewalls 84, 84'. Collectively, the cells 75 collate the aggregated workpieces 26a, 26b, 26c for orderly positioning and a sequence of welding operations.

Also shown in FIG. 8 is a special-purpose disposable collet adapter 90. The collet adapter 90 features a flat, annular flange 95 disposed circumferentially about an annulus of the distal end 92. It may be understood that the flange 95 could have different attributes of shape. Following a welding operation, the collet adapter 90 may remain permanently affixed to the associated workpiece 26b to facilitate attachment of additional structures to the welded workpiece.

FIG. 9 shows a collating strip subassembly and an aggregation of workpieces with attached disposable collet adapters. As FIG. 9 suggests, either collating strip subassembly 78, 79, shown in FIG. 8, may be used singularly to collate a sequence of workpieces 26a, 26b, 26c for a series of welding operations in an automatic-feeding stud welding tool. Using only a single subassembly, the shank of each workpiece 26a, 26b, 26c now will have only two points of attachment by cells 77 in the parallel sidewalls 83, 84.

Figure 10:
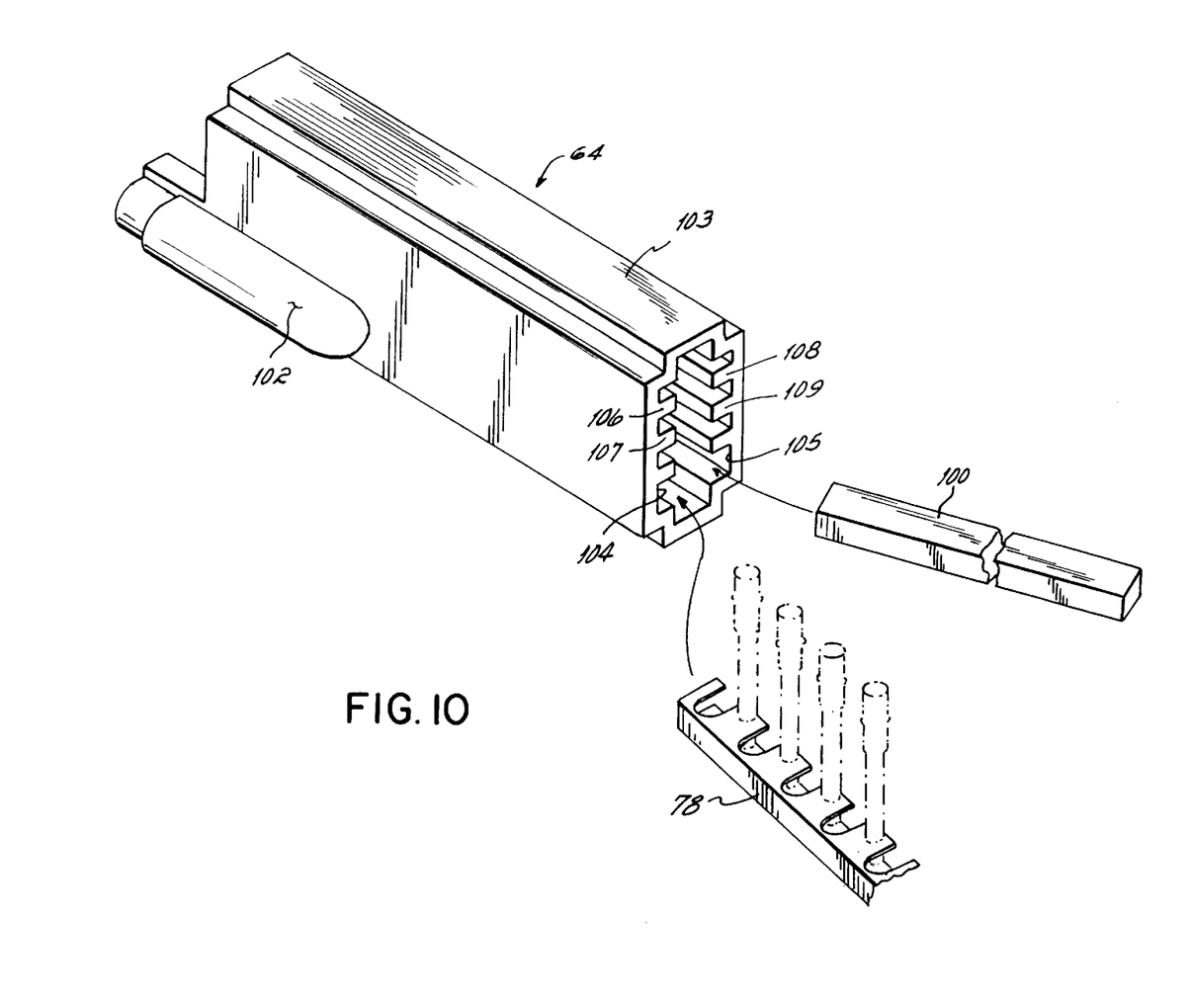
FIG. 10 is a perspective view of a magazine used in an automatic-feeding stud welding tool in which the collating strip assembly of FIG. 9 and an insert are simultaneously inserted.

FIG. 10 shows the collating strip subassembly of FIG. 9 being inserted into the opening of a magazine for use in an automatic-feeding stud welding tool. The magazine 64 comprises an elongate hollow member 103 having a pair of opposed, longitudinal slots 104, 105 adapted to slideably receive and guide either the collating strip subassembly 78 or a full collating strip assembly (as shown by collating strip assembly 65 in FIG. 8). Above the slots 104, 105, the magazine 64 includes two opposed pairs of longitudinal, inwardly opposed ribs 106, 108, 107, 109 that serve to guide the workpieces during their passage through the magazine 64. The version of the magazine 64 shown includes a motorized drive assembly 102 attached to the member 103. However, it may be understood that the magazine 64 can be manually operated in an alternative embodiment.

The collating strip subassembly 78 is inserted into the magazine 64. In the version of the magazine 64 shown, the motorized drive assembly 102 slideably moves the collating strip subassembly 78 relative to the stationary magazine 64 so as to position successive collated workpieces proximate to the electrode of the stud welding tool. Alternatively, the collating strip subassembly 98 can be manually moved within the magazine.

An insert 100 adapts the collating strip subassembly 78 for use in the magazine 64. The insert 100 is an elongate member that is slideably received adjacent the strip subassembly 78 within the interior of the magazine. In the preferred embodiment, the insert 100 is a rectangular elongate member but other shapes may be used. The insert 100 is slideably inserted along one sidewall of the magazine 64 between longitudinal slots 104, 105 so that the composite collating strip subassembly 78 and insert 100 will fill the space within the opening in the magazine 64. With the lateral positioning provided by the insert 100, the drive assembly 102 can engage the collating subassembly 78 for slideable movement and positioning the mounted and collated workpieces 26a, 26b, 26c proximate to the electrode 27 of the stud welding tool.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A disposable collet adapter and workpiece for use with a stud welding tool comprising:

a workpiece having opposing ends, a peripheral surface, and a cross-sectional profile at each opposing end, and a disposable collet adapter comprising a hollow, elongate sleeve, said sleeve having an inner surface, an outer surface, a proximal open end with a cross-sectional profile perpendicular to the longitudinal axis of said sleeve, a distal open end with a cross-sectional profile perpendicular to the longitudinal axis of said sleeve, said sleeve formed of a sheet of substantially uniform thickness extending between said proximal and distal ends, wherein the proximal open end of the sleeve is attachable in a readily releasable fashion to an electrode of a stud welding tool and the distal open end of the sleeve is releasably mountable to one of the opposing ends of the workpiece.

2. The disposable collet adapter and workpiece of claim 1 wherein the cross-sectional area of the proximal open end of said sleeve is greater than the cross-sectional area of the distal open end of said sleeve.

3. The disposable collet adapter and workpiece of claim 1 wherein the cross-sectional area of the proximal open end is less than the cross-sectional area of the distal open end of said sleeve.

4. The disposable collet adapter and workpiece of claim 1 wherein the cross-sectional area of the proximal open end of said sleeve is equal to the cross-sectional area of the distal open end of said sleeve.

5. The disposable collet adapter and workpiece of claim 1 further including at least one annular protrusion disposed about the inner surface of the sleeve, wherein each protrusion limits the range of slideable movement by the electrode or the workpiece within the interior of said sleeve.

6. The disposable collet adapter and workpiece of claim 1 wherein the sleeve of said collet adapter is cylindrical, the surface of said workpiece is cylindrical, and said workpiece further includes a plurality of threads circumferentially disposed about a portion of said surface.

7. The disposable collet adapter and workpiece of claim 6 wherein some of said threads are coated with a threadlocking chemical.

8. The disposable collet adapter and workpiece of claim 1 wherein the workpiece comprises an elongate flat member.

9. The disposable collet adapter and workpiece of claim 1 wherein said workpiece further includes a flange.

10. The disposable collet adapter and workpiece of claim 1 wherein said flange is attached to one of the opposing ends of said workpiece.

11. The disposable collet adapter and workpiece of claim 1 wherein the distal open end of the sleeve of said collet adapter includes a flange, said flange attached to the outer surface of the sleeve.

12. The disposable collet adapter and workpiece of claim 1 wherein the proximal open end of the sleeve of said collet adapter includes a flange, said flange attached to the outer surface of the sleeve.

13. The disposable collet adapter and workpiece of claim 1 wherein the sleeve of said collet adapter defines a longitudinal slit extending a portion of the length of said sleeve.

14. A kit comprising
a plurality of workpieces, each workpiece having opposing ends, a peripheral surface, and a cross-sectional profile at each opposing end, and
a plurality of disposable collet adapters, each collet adapter comprising a hollow, elongate sleeve, said sleeve having an inner surface, an outer surface, a proximal open end with a cross-sectional profile perpendicular to the longitudinal axis of said sleeve, a distal open end with a cross-sectional profile perpendicular to the longitudinal axis of said sleeve, said sleeve formed of a sheet of substantially uniform thickness extending between said proximal and distal ends, wherein the proximal open end of the sleeve is attachable in a readily releasable fashion to an electrode of a stud welding tool and the distal open end of the sleeve is releasably mountable to one of the opposing ends of the workpiece.

15. The kit of claim 14 further comprising a greater number of workpieces than disposable collet adapters.

16. The kit of claim 14 wherein the cross-sectional area of the proximal open end of said sleeve is greater than the cross-sectional area of the distal open end of said sleeve.

17. The kit of claim 14 wherein the cross-sectional area of the proximal open end is less than the cross-sectional area of the distal open end of said sleeve.

18. The kit of claim 14 wherein the cross-sectional area of the proximal open end of said sleeve is equal to the cross-sectional area of the distal open end of said sleeve.

19. The kit of claim 14 further including at least one annular protrusion disposed about the inner surface of the sleeve, wherein each protrusion limits the range of slideable movement by the electrode or the workpiece within the interior of said sleeve.

20. The kit of claim 14 wherein the sleeve of said collet adapter is cylindrical, the surface of said workpiece is cylindrical, and said workpiece further includes a plurality of threads circumferentially disposed about a portion of said surface.

21. The kit of claim 20 wherein some of said threads are coated with a threadlocking chemical.

22. The kit of claim 14 wherein the workpiece comprises an elongate flat member.

23. The kit of claim 14 wherein said workpiece further includes a flange.

24. The kit of claim 14 wherein said flange is attached to one of the opposing ends of said workpiece.

25. The kit of claim 14 wherein the distal open end of the sleeve of said collet adapter includes a flange, said flange attached to the outer surface of the sleeve.

26. The kit of claim 14 wherein the proximal open end of the sleeve of said collet adapter includes a flange, said flange attached to the outer surface of the sleeve.

27. The kit of claim 14 wherein the sleeve of said collet adapter defines a longitudinal slit extending a portion of the length of said sleeve.

* * * * *